(12) United States Patent
Asanuma (10) Patent No.: US 11,075,546 B2
(45) Date of Patent: Jul. 27, 2021

(54) ELECTRONIC APPARATUS AND METHOD (71) Applicant: KABUSHIKI KAISHA TOSHIBA, Tokyo (JP)

(72) Inventor: Yutaka Asanuma, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 114 days.

(21) Appl. No.: 16/558,608

(22) Filed: Sep. 3, 2019

(65) Prior Publication Data

US 2020/0185966 A1 Jun. 11, 2020

(30) Foreign Application Priority Data

Dec. 6, 2018 (JP) .............................. JP2018-229102

(51) Int. Cl.
*H02J 50/12* (2016.01)
*H02J 50/40* (2016.01)
*H02J 50/80* (2016.01)
*H04B 5/00* (2006.01)

(52) U.S. Cl.
CPC .............. *H02J 50/12* (2016.02); *H02J 50/40* (2016.02); *H02J 50/80* (2016.02); *H04B 5/0031* (2013.01); *H04B 5/0037* (2013.01)

(58) Field of Classification Search
None
See application file for complete search history.

(56) References Cited

U.S. PATENT DOCUMENTS

| 9,876,536 | B1* | 1/2018 | Bell | H02J 50/40 |
| 10,008,887 | B2* | 6/2018 | Zeine | H02J 7/0047 |
| 2015/0349543 | A1 | 12/2015 | Sakata et al. | |
| 2016/0064992 | A1* | 3/2016 | Herbst | H02J 50/10 |
| | | | | 307/104 |
| 2018/0287426 | A1* | 10/2018 | White, II | H02J 50/12 |

FOREIGN PATENT DOCUMENTS

JP 2016007117 A 1/2016

OTHER PUBLICATIONS

"Dedicated Short-Range Communication System", ARIB Standard (Version 1.0), ARIB STD-T75 (Version 1.0), Sep. 9, 2001, 469 pages.

* cited by examiner

*Primary Examiner* — Jared Fureman
*Assistant Examiner* — Joel Barnett
(74) *Attorney, Agent, or Firm* — Holtz, Holtz & Volek PC (57) ABSTRACT

According to one embodiment, an electronic apparatus includes transmitter circuitry and processing circuitry. The transmitter circuitry transmits a first transmission signal during a first period via a transmission frequency band defined by a first wireless communication standard. The processing circuitry performs carrier sensing in a first frequency band during a second period following the first period. The transmitter circuitry further transmits, if a wireless signal is not detected in the carrier sensing, a second transmission signal during a third period following the second period. The processing circuitry performs, if the wireless signal is detected in the carrier sensing, carrier sensing in the first frequency band during a fourth period following the second period.

18 Claims, 10 Drawing Sheets

| Frame length [slots] | Time length of frame [msec] |
|---|---|
| 3 slots | 2.34375(=3×0.78125 [msec]) |
| 5 slots | 3.90625(=5×0.78125 [msec]) |
| 9 slots | 7.03125(=9×0.78125 [msec]) |

Note that 1 slot corresponds to 0.78125 [msec]

ELECTRONIC APPARATUS AND METHOD

CROSS-REFERENCE TO RELATED APPLICATIONS

This application is based upon and claims the benefit of priority from Japanese Patent Application No. 2018-229102, filed Dec. 6, 2018, the entire contents of which are incorporated herein by reference.

FIELD

Embodiments described herein relate generally to a wireless power transfer technique.

BACKGROUND

In recent years, wireless power transfer systems that perform wireless power supply with an electromagnetic wave have been developed. In general, the electromagnetic wave used for power supply in the wireless power transfer systems has transmit power or equivalent isotropically radiated power (EIRP) greater than that of an electromagnetic wave used for communication. Thus, there is a high possibility that the electromagnetic wave of the wireless power transfer systems interferes with the electromagnetic wave of other wireless communication systems.

Therefore, a novel technique to reduce the interference with other wireless communication systems is required.

DETAILED DESCRIPTION

Various embodiments will be described hereinafter with reference to the accompanying drawings.

In general, according to one embodiment, an electronic apparatus includes transmitter circuitry and processing circuitry. The transmitter circuitry is configured to transmit a first transmission signal for power supply during a first period via a transmission frequency band defined by a first wireless communication standard. The processing circuitry is configured to perform carrier sensing in a first frequency band comprising at least the transmission frequency band during a second period following the first period. The second period is equal to or longer than a length of the first frame. The transmitter circuitry is further configured to transmit, if a wireless signal is not detected in the carrier sensing performed during the second period, a second transmission signal for power supply during a third period following the second period. The processing circuitry is configured to perform, if the wireless signal is detected in the carrier sensing performed during the second period, carrier sensing in the first frequency band during a fourth period following the second period.

First Embodiment

Firstly, the structure of an electronic apparatus of an embodiment will be explained with reference to FIG. 1. The electronic apparatus is a wireless power transmission apparatus 1 that supplies power wirelessly using an electromagnetic wave. The electromagnetic wave is, for example, a microwave, and is a wireless signal for power transmission (hereinafter may be referred to as a power transmission signal). A power reception apparatus 2 includes a circuit and the like to receive the power transmission signal. The power transmission signal, which is transmitted by the wireless power transmission apparatus 1, is received by the power reception apparatus 2. Thus, the power is supplied to the power reception apparatus 2.

In general, as compared to a wireless signal used for communication (hereinafter may be referred to as a communication signal), the power transmission signal has a greater transmission power or a greater EIRP. Thus, the power transmission signal may possibly interfere with a communication signal of a frequency band that is transferred in another wireless communication system 3. That is, the wireless power transmission apparatus 1 may become an interfering apparatus that interferes with the wireless communication system 3, and the wireless communication system 3 may be an interfered system with which the wireless power transmission apparatus 1 interferes.

Thus, the wireless power transmission apparatus 1 of the present embodiment has a power transmission control function to reduce the interference with the wireless communication system 3. The wireless power transmission apparatus 1 reduces the interference with the wireless communication system 3 using the power transmission control function if the wireless power transmission apparatus 1 is newly provided, if the wireless communication system 3 is newly established, or if at least one of the directivity of a radio signal (i.e., a wireless signal) transmitted/received by the wireless power transmission apparatus 1 and the directivity of a radio signal transmitted/received by the wireless communication system 3 is changed.

Hereinafter, for better understanding of the description, a case where the wireless communication system 3 conforms to an ARIB STD-75, that is, a standard of a dedicated short-range communication (DSRC) system will be mainly explained. The DSRC system is used in, for example, an electronic toll collection (ETC) system. The radio frequency band used in the DSRC system is, for example, 5.8 GHz.

The wireless communication system 3 includes a roadside apparatus 3A that is a wireless communication apparatus fixed to a roadside site or the like (that is, a base station) and an in-vehicle apparatus 3B that is a wireless communication apparatus mounted in a vehicle or the like (that is, a mobile station). The roadside apparatus 3A periodically transmits a radio signal used for transfer of a communication frame. The communication frame includes a specific communication signal that contains predetermined bits (hereinafter may be referred to as a known signal) in order to allow the in-vehicle apparatus 3B to detect the roadside apparatus 3A. Note that the wireless communication system 3 may conform to other wireless communication standards such as a wireless LAN communication standard.

Figure 1:
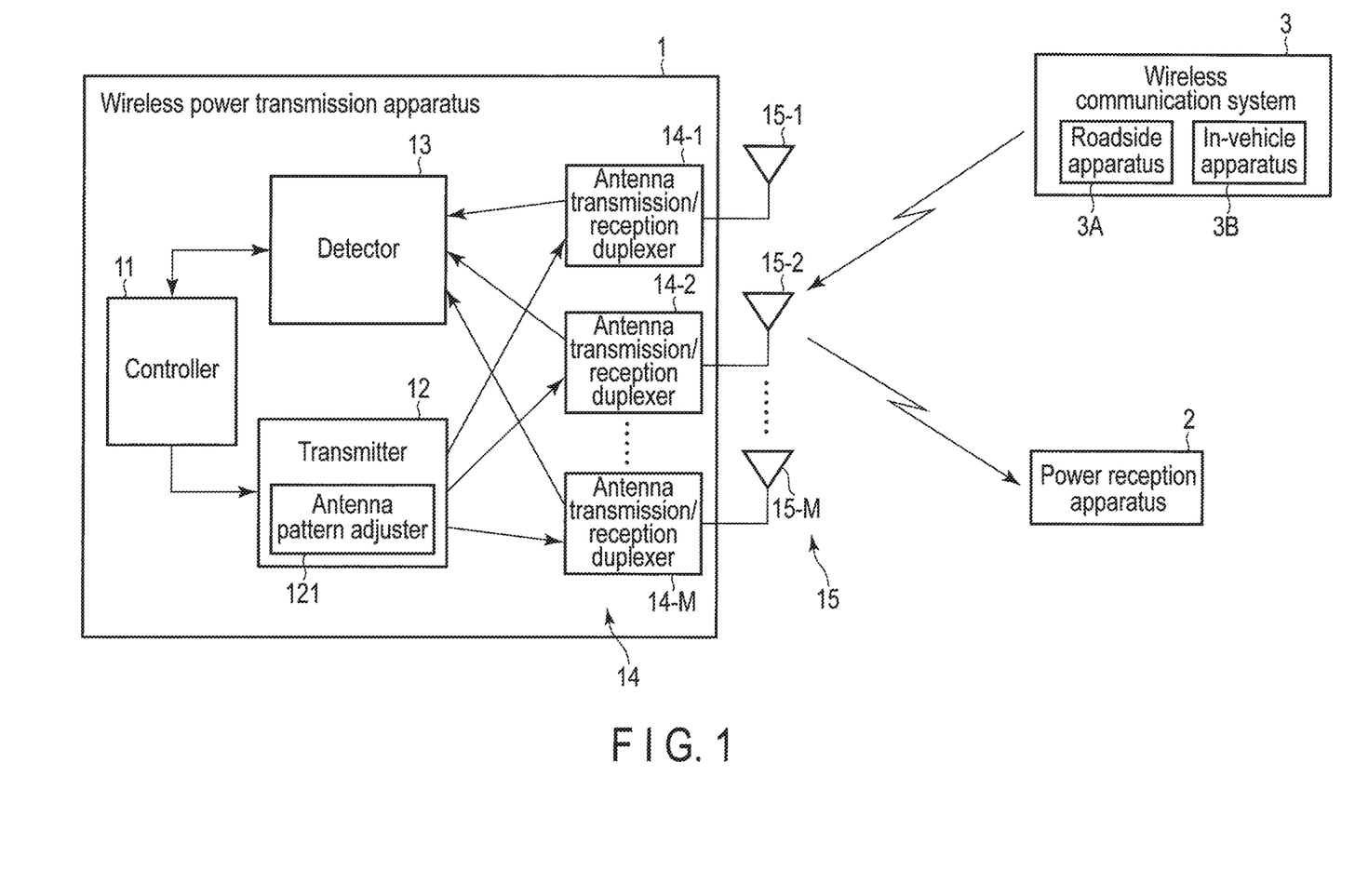
FIG. 1 is a block diagram illustrating an example of the structure of an electronic apparatus according to a first embodiment.

As illustrated in FIG. 1, the wireless power transmission apparatus 1 includes a controller 11, a transmitter 12, a detector 13, one or more antenna transmission/reception duplexers 14, and one or more antennas 15. Each component may be realized as a circuit. The controller 11, the transmitter 12, and the detector 13 may be provided with one chip, or may be provided with multiple chips. Now, the operation of each component used to realize the above-mentioned power transmission control function will be explained.

The one or more antenna transmission/reception duplexers 14-1, 14-2, . . . , and 14-M are connected to one or more antennas 15-1, 15-2, . . . , 15-M, respectively. Each pair of an antenna transmission/reception duplexer 14 and an antenna 15 (for example, the pair of the antenna transmission/reception duplexer 14-1 and the antenna 15-1) may transmit a power transmission signal to the power reception apparatus 2 and receive a communication signal transmitted by the wireless communication system 3 to input the communication signal to the wireless power transmission apparatus 1.

The controller 11 controls the operation of each component in the wireless power transmission apparatus 1. The controller 11 controls a power transmission signal, which is transmitted by the transmitter 12 through the antenna transmission/reception duplexer 14 and the antenna 15, and the timing of transmission of the signal. The controller 11 designates a time (period) for which power is transmitted and requests the transmitter 12 to start power transmission for the time, for example. Alternatively, the controller 11 may request the transmitter 12 to start power transmission, and may request the transmitter 12 to stop the power transmission after a certain time from the start.

The transmitter 12 transmits a power transmission signal for power supply through the antenna transmission/reception duplexers 14 and the antennas 15 in accordance with the request by the controller 11. For example, the transmitter 12 generates a power transmission signal and transmits the power transmission signal to the power reception apparatus 2 through the antenna transmission/reception duplexers 14 and the antennas 15 from the time of receipt of the request of a start of power transmission until a designated time has passed.

Furthermore, the controller 11 controls carrier sensing performed by the detector 13 through the antenna transmission/reception duplexers 14 and the antennas 15. In the carrier sensing, the detector 13 detects, based on an amplitude of an input radio signal of a specific frequency band, an occurrence of transmission/reception of radio signals by a terminal and the like in the wireless communication system 3. Alternatively, in the carrier sensing, the detector 13 may detect the occurrence of transmission/reception duplexer of radio signals by a terminal and the like in the wireless communication system 3 by further signal processing like decoding the input radio signal of the specific frequency band. The specific frequency band is a frequency band including at least a transmission frequency band of a communication frame 4 defined in a wireless communication standard.

The controller 11 designates a time (period) of carrier sensing during which the detector 13 monitors an occurrence of transmission/reception of a radio signal by the wireless communication system 3 (more specifically, an occurrence of a communication signal transmitted by the roadside apparatus 3A), and requests the detector 13 to start monitoring for the designated time. Alternatively, the controller 11 may request the detector 13 to start monitoring, and may request the detector 13 to stop the monitoring after a certain time from the start.

In accordance with the request by the controller 11, the detector 13 monitors a radio signal received through the antenna transmission/reception duplexers 14 and the antennas 15 and detects (carrier-senses) an occurrence of a communication signal transmitted by the wireless communication system 3. The detector 13 detects an occurrence of a communication signal transmitted by the wireless communication system 3 from the time when the controller 11 requests the start of monitoring until a designated time has passed from the start, for example. The communication signal to be detected is, for example, a radio signal of a frequency band that includes at least the transmission frequency band of the communication frame 4 defined in a specific wireless communication standard, and the radio signal has a power equal to or larger than a threshold power. Note that the detector 13 may detect the occurrences of multiple types of communication signals transmitted by multiple types of wireless communication systems 3.

The controller 11 further controls the directivity of the transmitted power transmission signal and the directivity of the received communication signal by beam forming to control patterns of radio signals transmitted and received through each pair of an antenna transmission/reception duplexer 14 and an antenna 15 (hereinafter may be referred to as antenna patterns). In order to perform the beam forming, the controller 11 selects one or more pairs used for the transmission/reception from the pairs of an antenna transmission/reception duplexer 14 and an antenna 15. When, for example, requesting the transmitter 12 to start power transmission, the controller 11 designates an antenna pattern by determining a power transmission signal transmitted through each of the one or more selected pairs.

The transmitter 12 may include an antenna pattern adjuster 121. The antenna pattern adjuster 121 generates a power transmission signal based on an antenna pattern designated by the controller 11. The transmitter 12 transmits the generated power transmission signal through the designated pair of the antenna transmission/reception duplexer 14 and the antenna 15. Thus, the power transmission signal having a specific directivity can be transmitted.

Figure 2:
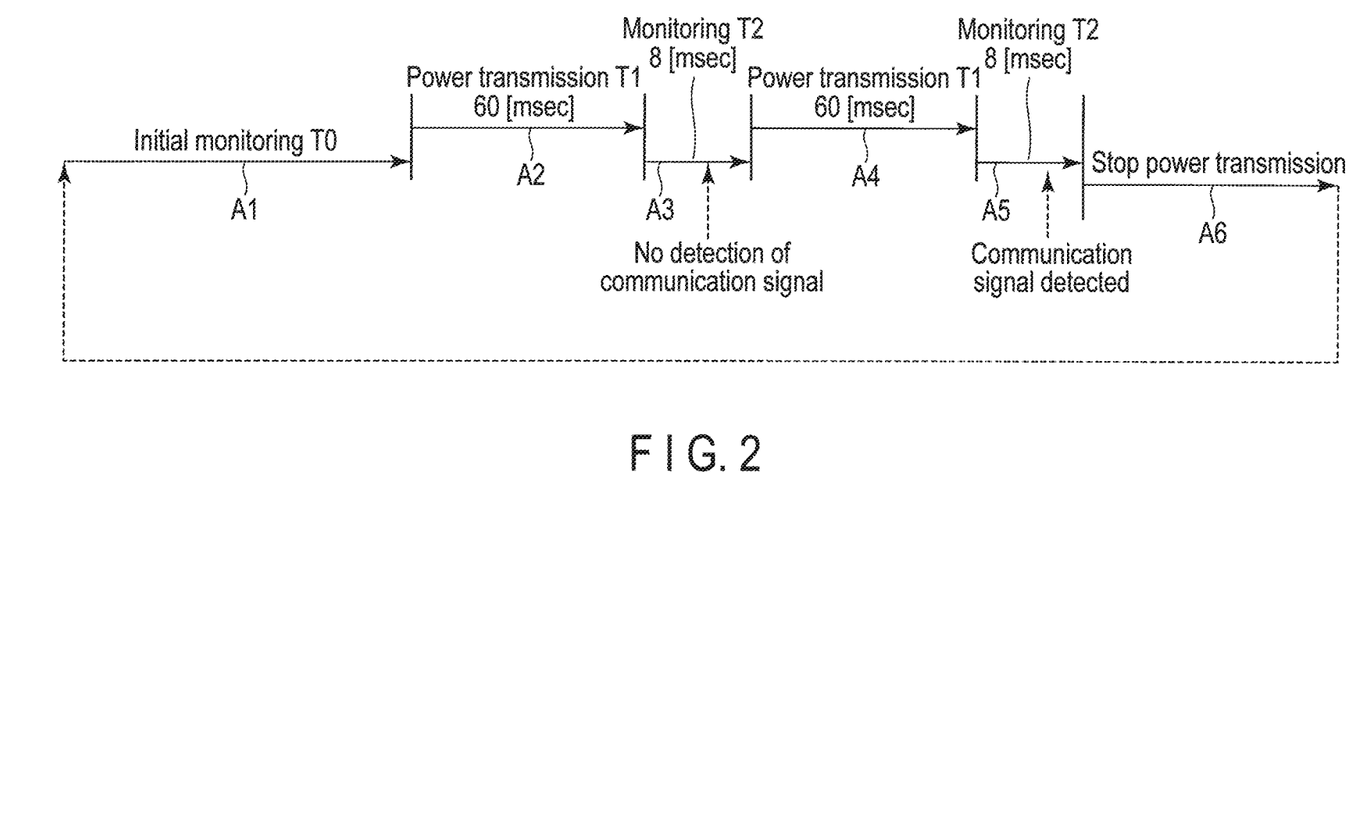
FIG. 2 is a time chart illustrating an example of an operation by the electronic apparatus of the first embodiment.

FIG. 2 is a time chart illustrating an example of an operation by the wireless power transmission apparatus 1.

Initially, the detector 13 performs initial monitoring (carrier sensing) during a period T0 through the antenna transmission/reception duplexers 14 and the antennas 15 (A1). If a communication signal (for example, a DSRC signal) transmitted by the wireless communication system 3 has not been detected within the period T0 for which the initial monitoring has been performed, the transmitter 12 performs power transmission during a period T1 (A2).

After the power transmission performed during the period T1, the detector 13 performs monitoring (carrier sensing) during a period T2 (A3). If a communication signal transmitted by the wireless communication system 3 has not been detected within the period T2 for which the monitoring is performed, the transmitter 12 performs power transmission during the period T1 (A4).

Then, after the power transmission performed during the period T1, the detector 13 performs monitoring during the period T2 (A5). If a communication signal transmitted by the wireless communication system 3 has been detected within the period T2 for which the monitoring is performed, the transmitter 12 does not perform power transmission during the period T1 (A6). That is, the power transmission performed during the period T1 is stopped. If the power transmission is not performed, the detector 13 performs initial monitoring during the period T0. The detector 13 may wait for the start of the initial monitoring, which is performed during the period T0, for a designated time after the stop of the power transmission.

As can be understood from the above, while a communication signal is not detected, the power transmission performed during the period of T1 and the monitoring performed during the period T2 are repeated, and if a communication signal transmitted by the wireless communication system 3 is detected during the monitoring performed during the period T2, the power transmission during the period T1 is not performed, and the process returns to the initial monitoring performed during the period T0. Thus, interference, which is caused by the power transmission by the wireless power transmission apparatus 1, with the communication performed by the wireless communication system 3 can be reduced.

Figure 3:
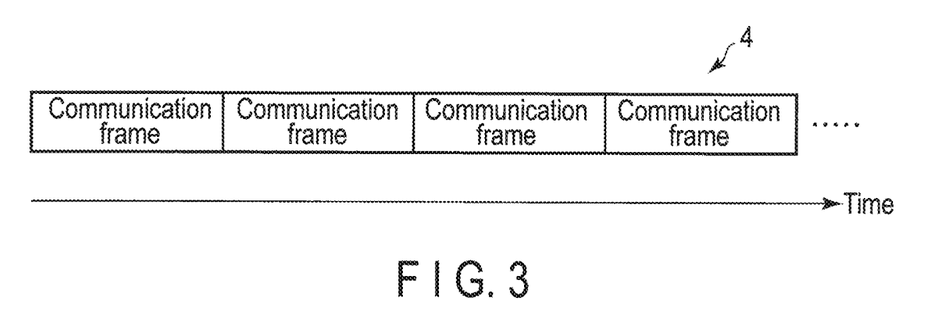
FIG. 3 is a diagram illustrating an example of transmission of communication frames in a dedicated short-range communication (DSRC) system with which the electronic apparatus of the first embodiment interferes.

As illustrated in FIG. 3, the roadside apparatus 3A of the wireless communication system 3 may transmit communication frames 4, which specified by the wireless communication standard, constantly and successively, for example. As described above, the wireless communication standard is a standard of the DSRC system, for example. Furthermore, the communication frame 4 defined in the wireless communication standard includes, for example, a frame control message slot (FCMS) defined in the standard of the DSRC system. Each communication frame 4 includes a known signal defined by the wireless communication standard. The detector 13 of the wireless power transmission apparatus 1 performs carrier sensing during the initial monitoring during the period T0 and the monitoring during the period T2 to detect the existence of the wireless communication system 3 based on whether or not a radio signal, which is input (received) through the antennas 15 and the antenna transmission/reception duplexers 14, includes a known signal.

Figure 4:
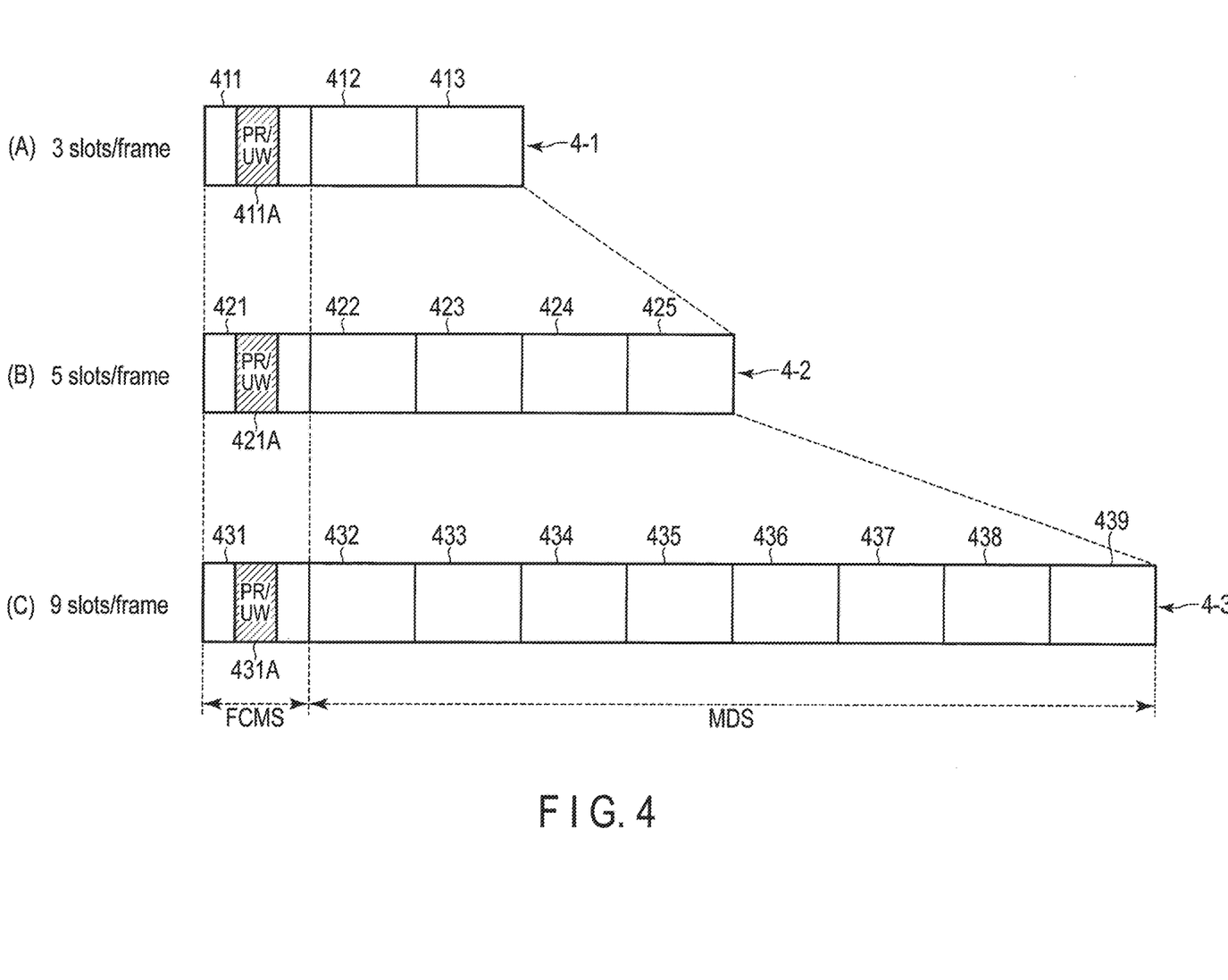
FIG. 4 is a diagram illustrating an example of a format of the communication frame of FIG. 3.

FIG. 4 illustrates an example of a format of a communication frame 4 transferred in the wireless communication system 3. In this example, slots mainly transmitted by the roadside apparatus 3A in the wireless communication system 3 will be explained.

The communication frame 4 has a variable frame structure including one FCMS and multiple message data slots (MDSs). One communication frame 4 includes, for example, three slots, five slots, or nine slots. Each slot has the same time length, and is defined to be 100 octets (800 bits) based on the data transmission rate of 1024 kbps, for example.

The FCMS is used to transfer a frame control message channel (FCMC) including, for example, slot allocation information, frame control information, and the like. The MDS is used for data transfer.

FIG. 4(A) indicates a communication frame 4-1 composed of three slots. An FCMS 411 is provided at the head of the communication frame 4-1, and two MDSs 412 and 413 following the FCMS 411 are provided.

FIG. 4(B) indicates a communication frame 4-2 composed of five slots. An FCMS 421 is provided at the head of the communication frame 4-2, and four MDSs 422, 423, 424, and 425 following the FCMS 421 are provided.

FIG. 4(C) indicates a communication frame 4-3 composed of nine slots. An FCMS 431 is provided at the head of the communication frame 4-3, and eight MDSs 432, 433, 434, 435, 436, 437, 438, and 439 following the FCMS 431 are provided.

The FCMS 411, 421, and 423 include a preamble (PR) signal and a unique word (UW) signal 411A, 421A, and 431A, respectively. The preamble signal is used in symbol synchronization, and the unique word signal is used in slot synchronization or the like. The preamble signal is a known signal preliminarily defined as a signal of specific bits. The unique word signal is a known signal preliminarily defined as a signal of specific bits.

For example, in the standard of the DSRC system (ARIB STD-T75), in a case where a modulation method is ASK, the preamble signal is defined as 16 bits of "1010101010101010", and the unique word signal is defined as 32 bits of "00011011101010000100101100111110".

If a radio signal, which is input the wireless power transmission apparatus 1 through the antenna 15 and the antenna transmission/reception duplexer 14 by the carrier sensing performed in the initial monitoring during the period T0 or in the monitoring during the period T2, includes a known signal that is at least one of the preamble signal and the unique word signal, the detector 13 in the wireless power transmission apparatus 1 determines that the communication signal transmitted by the wireless communication system 3 is detected, that is, the wireless communication system 3 exists. In order to securely detect the existence of the wireless communication system 3, a period for which at least one known signal (that is, the preamble signal and/or the unique word signal) can be detected must be set as the period T2 for monitoring. Thus, the period T2 is set to be equal to or longer than a time corresponding to the length (that is, the frame length) of one communication frame 4.

Figure 5:
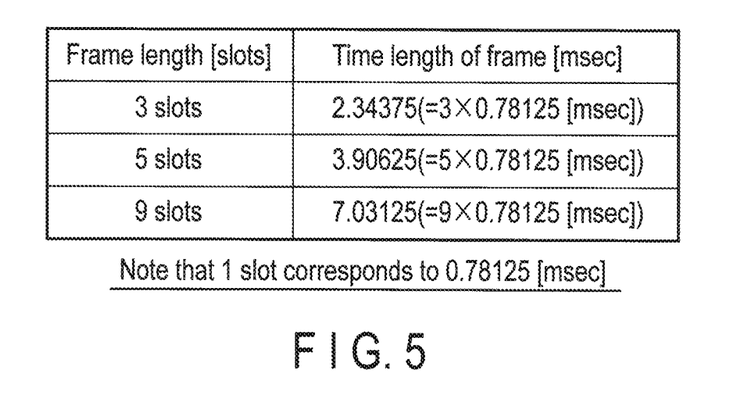
FIG. 5 is a diagram illustrating an example of a time length of the communication frame of FIG. 3.

FIG. 5 illustrates an example of a time corresponding to the frame length of one communication frame 4 (that is, the time length of one communication frame 4). As explained above, each slot has the same time length, and is defined as 100 octets based on the data transmission rate of 1024 kbps, for example. In that case, the time length of one slot corresponds to 0.78125 milliseconds (ms).

Thus, the time length (i.e., the frame period) of the communication frame 4-1 composed of three slots is 2.34375 ms (=3×0.78125 ms). The time length of the communication frame 4-2 composed of five slots is 3.90625 ms (=5×0.78125 ms). Furthermore, the time length of the communication frame 4-3 composed of nine slots is 7.03125 ms (=9×0.78125 ms).

In this example, the longest frame length is the frame length of the nine slots, and thus, if the frame structure of the communication frame 4 is unknown, the period T2 for monitoring is equal to or longer than 7.03125 ms that is a time corresponding to the frame length of the longest nine slots. Thus, for example, 8 ms is set as the period T2.

Note that the period T0 for the initial monitoring is, for example, a time in units of second that is longer than the period T2 for which the monitoring after the power transmission is performed, in order to detect a communication signal transmitted by the wireless communication system 3 with higher accuracy. Furthermore, the period T1 for the power transmission is, for example, shorter than the period T0 and longer than the period T2. For example, 60 ms is set as the period T1.

Thus, as illustrated in FIG. 2, before the transmitter 12 starts the power transmission, the detector 13 performs, through the antenna transmission/reception duplexers 14 and the antennas 15, carrier sensing in a first frequency band including at least the transmission frequency band of the communication frame 4 during the period T0 that precedes the period T1 for which the power transmission signal will be transmitted and is longer than each of the period T1 and the period T2 (A1). Specifically, the detector 13 is capable of detecting a known signal, which is at least one of the preamble signal and the unique word signal, from the radio signal input during the period T0. If a known signal has been detected, the detector 13 determines that a communication signal to transmit the communication frame 4 is input (received) within the period T0.

If any communication signal has not been detected by the carrier sensing performed during the period T0, the transmitter 12 transmits a power transmission signal during the period T1 (for example, 60 ms) following the period T0 (A2). Then, the detector 13 performs carrier sensing in the first frequency band during the period T2 (for example, 8 ms) through the antenna transmission/reception duplexers 14 and the antennas 15 (A3). The first frequency band includes at least the transmission frequency band of the communication frame 4. The period T2 follows the period T1 for which the power transmission signal is transmitted, and is equal to or longer than the time corresponding to the length (that is, the frame length) of the communication frame 4. Specifically, the detector 13 is capable of detecting a known signal, which is at least one of the preamble signal and the unique word signal, from the radio signal input during the period T2. If the known signal has been detected, the detector 13 determines that a communication signal to transmit the communication frame 4 has been input (received) during the period T2.

Then, if a communication signal has not been detected through the carrier sensing performed during the period T2, the transmitter 12 transmits a power transmission signal during the period T1 following the period T2 (A4). On the other hand, if a communication signal has been detected through the carrier sensing performed during the period T2, the transmitter 12 does not transmit a power transmission signal for at least the period T1 that follows the period T2 (A5) for which the communication signal has been detected (A6). That is, power transmission during the period T1 is stopped.

Note that the detector 13 may monitor several types of communication signals during the monitoring during the period T2. The several types of communication signals are radio signals to transfer communication frames 4 based on the different wireless communication standards. That is, the detector 13 performs carrier sensing in a second frequency band, which includes at least the transmission frequency bands of the frames, through the antenna transmission/reception duplexers 14 and the antennas 15 during the period T2. The period T2 follows the period T1 and is equal to or longer than a time corresponding to any one of the lengths of the communication frames 4 that are defined by the different wireless communication standards, respectively. In that case, the period T2 is, for example, set to be equal to or longer than a time corresponding to a length of the longest frame of the communication frames 4.

For example, the detector 13 performs carrier sensing in a second frequency band during the period T2 following the period T1. The second frequency band includes at least the transmission frequency band of a first communication frame defined in a first wireless communication standard (for example, the standard of DSRC) and the transmission frequency band of a second communication frame defined in a second wireless communication standard (for example, the wireless LAN communication standard). If a communication signal has not been detected by the carrier sensing performed during the period T2, the transmitter 12 transmits a power transmission signal during the period T1 following the period T2. Since several types of communication signals are monitored during the monitoring performed during the period T2, an affect that the period T1 for the power transmission is shortened can be reduced.

Figure 6:
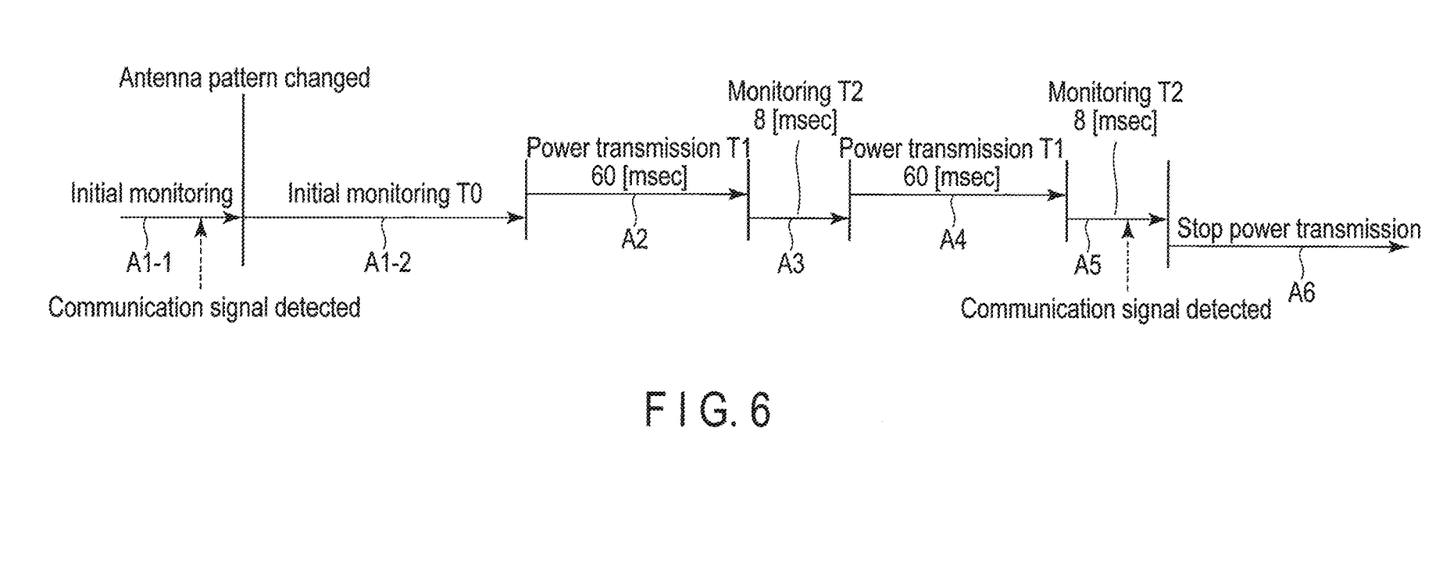
FIG. 6 is a time chart illustrating an example of another operation of the electronic apparatus of the first embodiment.

Furthermore, as illustrated in FIG. 6, if the communication frame 4 has been detected by carrier sensing (initial monitoring) performed during the period T0 (A1-1), the antenna pattern adjuster 121 may change at least one of the directivity of a power transmission signal transmitted by the transmitter 12 through one or more of the antenna transmission/reception duplexers 14 and one or more of the antennas 15 and the directivity (antenna pattern) of a communication signal received by the detector 13 through one or more of the antenna transmission/reception duplexers 14 and one or more of the antennas 15. The detector 13 performs carrier sensing in the first frequency band, which includes at least the transmission frequency band of the communication frame 4, during the period T0 after the change of the directivity (A1-2).

If the antenna pattern has been changed, the interference with the wireless communication system 3 is changed. Thus, by performing the initial monitoring during the period T0 again after the change, the interference with the wireless communication system 3 caused by a power transmission signal with the appropriate changed antenna pattern can be reduced.

Through the above structure, the interference with the wireless communication system 3 caused by the wireless power transmission apparatus 1 can be reduced.

Figure 7:
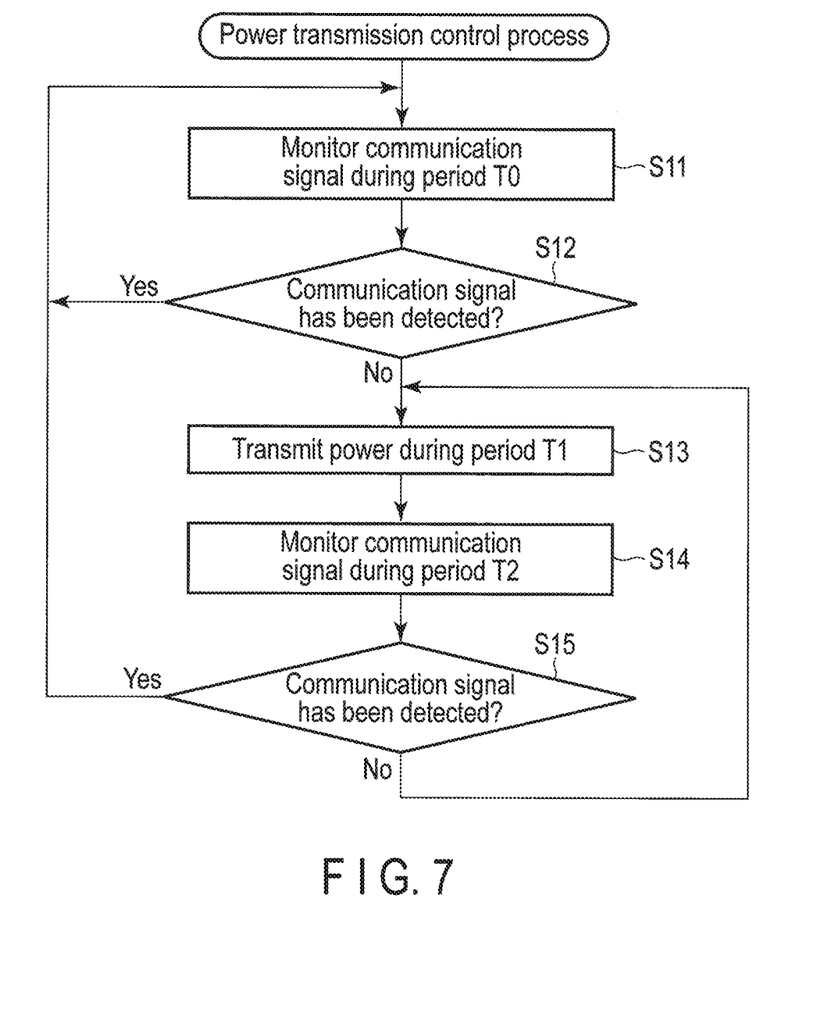
FIG. 7 is a flowchart illustrating an example of the procedure of a power transmission control process executed by the electronic apparatus of the first embodiment.

With reference to a flowchart of FIG. 7, an example of the procedure of a power transmission control process executed by the wireless power transmission apparatus 1 will be explained.

Firstly, the wireless power transmission apparatus 1 monitors, through the antenna transmission/reception duplexers 14 and the antennas 15, a communication signal transmitted by the wireless communication system 3 during a period T0 for initial monitoring (step S11). That is, the wireless power transmission apparatus 1 performs carrier sensing in a first frequency band, which includes at least a transmission frequency band of a communication frame 4, during the period T0. In other words, the antenna transmission/reception duplexers 14 and the antennas 15 receive the communication signal transmitted by the wireless communication system 3 during the period T0 to input the signal to the wireless power transmission apparatus 1 (specifically, the detector 13).

The wireless power transmission apparatus 1 determines whether a communication signal transmitted by the wireless communication system 3 has been detected during the period T0 (step S12). The wireless power transmission apparatus 1 determines that a communication signal transmitted by the wireless communication system 3 has been detected if, for example, a radio signal, which has a power level equal to or larger than a threshold value and includes a known signal, is input to the wireless power transmission apparatus 1 through the antenna transmission/reception units duplexer 14 and the antennas 15.

If a communication signal transmitted by the wireless communication system 3 has been detected (YES in step S12), the process returns to step S11, and the initial monitoring of a communication signal is continued. Note that the directivity of a radio signal transmitted/received by the wireless power transmission apparatus 1 may be changed before the process returns to step S11.

On the other hand, if a communication signal transmitted by the wireless communication system 3 has not been detected (NO in step S12), the wireless power transmission apparatus 1 performs power transmission during the period T1 (step S13). That is, the wireless power transmission apparatus 1 transmits a power transmission signal through the antenna transmission/reception duplexers 14 and the antennas 15 during the period T1.

Then, the wireless power transmission apparatus 1 monitors a communication signal transmitted by the wireless communication system 3 during the period T2 following the period T1 through the antenna transmission/reception duplexers 14 and the antennas 15 (step S14). That is, the wireless power transmission apparatus 1 performs carrier sensing in the first frequency band including at least the transmission frequency band of the communication frame 4 during the period T2 following the period T1. In other words, the antenna transmission/reception duplexers 14 and the antennas 15 may receive a communication signal transmitted by the wireless communication system 3 during the period T2 to input the signal to the wireless power transmission apparatus 1.

Then, the wireless power transmission apparatus 1 determines whether a communication signal transmitted by the wireless communication system 3 has been detected during the period T2 (step S15). If a communication signal transmitted by the wireless communication system 3 has not been detected (NO in step S15), the process returns to step S13, and power transmission is performed during the period T1.

On the other hand, if a communication signal transmitted by the wireless communication system 3 has been detected (YES in step S15), the process returns to step S11, and the initial monitoring of a communication signal is performed again.

Through the above process, if the communication signal transmitted by the wireless communication system 3 is detected, power transmission is stopped, and therefore, interference with the wireless communication system 3 caused by the wireless power transmission apparatus 1 can be reduced.

Figure 8:
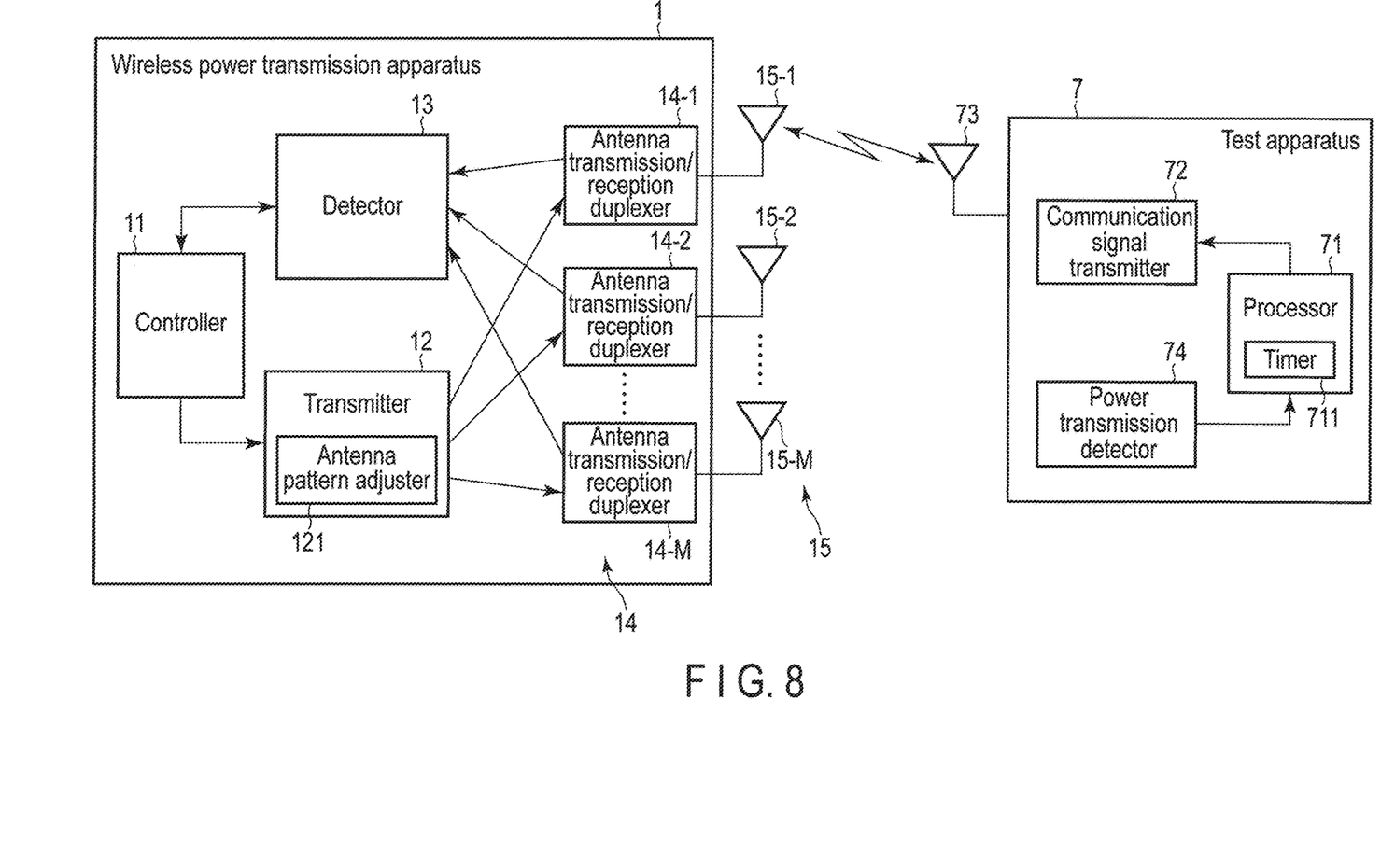
FIG. 8 is a block diagram illustrating an example of the structure of a test apparatus that tests the power transmission control function of the electronic apparatus of the first embodiment.

Furthermore, FIG. 8 illustrates the structure of a test apparatus 7 that verifies whether the wireless power transmission apparatus 1 includes a power transmission control function to reduce the interference with the wireless communication system 3. The test apparatus 7 establishes a wired or wireless connection to the wireless power transmission apparatus 1.

The test apparatus 7 includes a processor 71, a communication signal transmitter 72, an antenna 73, and a power transmission detector 74. Each component may be realized as a circuit. Furthermore, the processor 71, the communication signal transmitter 72, and the power transmission detector 74 may be provided with one chip or may be provided with multiple chips.

The power transmission detector 74 detects a start and a stop of the power transmission by the wireless power transmission apparatus 1 based on a power transmission signal input (received) through the antenna 73. The power transmission detector 74 may notify the processor 71 that the wireless power transmission apparatus 1 starts the power transmission, that the wireless power transmission apparatus 1 stops the power transmission, or the like.

The processor 71 controls a transmission time of a communication signal, which includes a known signal and is transmitted by the communication signal transmitter 72 and the antenna 73, in accordance with a state of the power transmission by the wireless power transmission apparatus 1. The communication signal including the known signal is a radio signal to transmit a communication frame 4 including an FCMS, for example. As mentioned above, the FCMS includes a preamble signal and a unique word signal that are known signals.

If the start of the power transmission by the wireless power transmission apparatus 1 has been detected, the processor 71 instructs the communication signal transmitter 72 to start transmission of the communication signal including the known signal, and starts a timer 711. The known signal is periodically transmitted until the stop of the power transmission by the wireless power transmission apparatus 1 is detected. Then, the processor 71 stops the timer 711 if the power transmission detector 74 has detected the stop of the power transmission by the wireless power transmission apparatus 1. The processor 71 records the measured time t by the timer 711. The measurement time t by the timer 711 indicates a period of time from the start of transmission of the communication signal including the known signal until the detection of the stop of power transmission by the wireless power transmission apparatus 1.

The processor 71, the communication signal transmitter 72, and the power transmission detector 74 perform the operation to measure the measurement time t repeatedly, for example, for N times to acquire N measurement times t.

The processor 71 calculates a ratio of measurement times t, which exceed a threshold time Td, to the N measurement times t (that is, an error ratio), and determines whether the calculated ratio exceeds a specific ratio p. The threshold time Td is the sum of the period T1 for power transmission and the period T2 for monitoring, for example. If the calculated ratio is equal to or smaller than the specific ratio p, the processor 71 determines that the wireless power transmission apparatus 1 performs at least the monitoring during the period T2 and has the power transmission control function. On the other hand, if the calculated ratio exceeds the specific ratio p, the processor 71 determines that the wireless power transmission apparatus 1 does not perform the monitoring during the period T2 and does not have the power transmission control function.

Alternatively, the processor 71 may calculate a ratio of measurement times t, which are equal to or shorter than the threshold time Td, to the N measurement times t (that is, a pass ratio), and determines whether the calculated ratio exceeds a specific ratio p'. If the calculated ratio exceeds the specific ratio p', the processor 71 determines that the wireless power transmission apparatus 1 performs at least the monitoring during the period T2 and has the power transmission control function. On the other hand, if the calculated ratio is equal to or smaller than the specific ratio p', the processor 71 determines that the wireless power transmission apparatus 1 does not perform the monitoring during the period T2 and does not have the power transmission control function.

Figure 9:
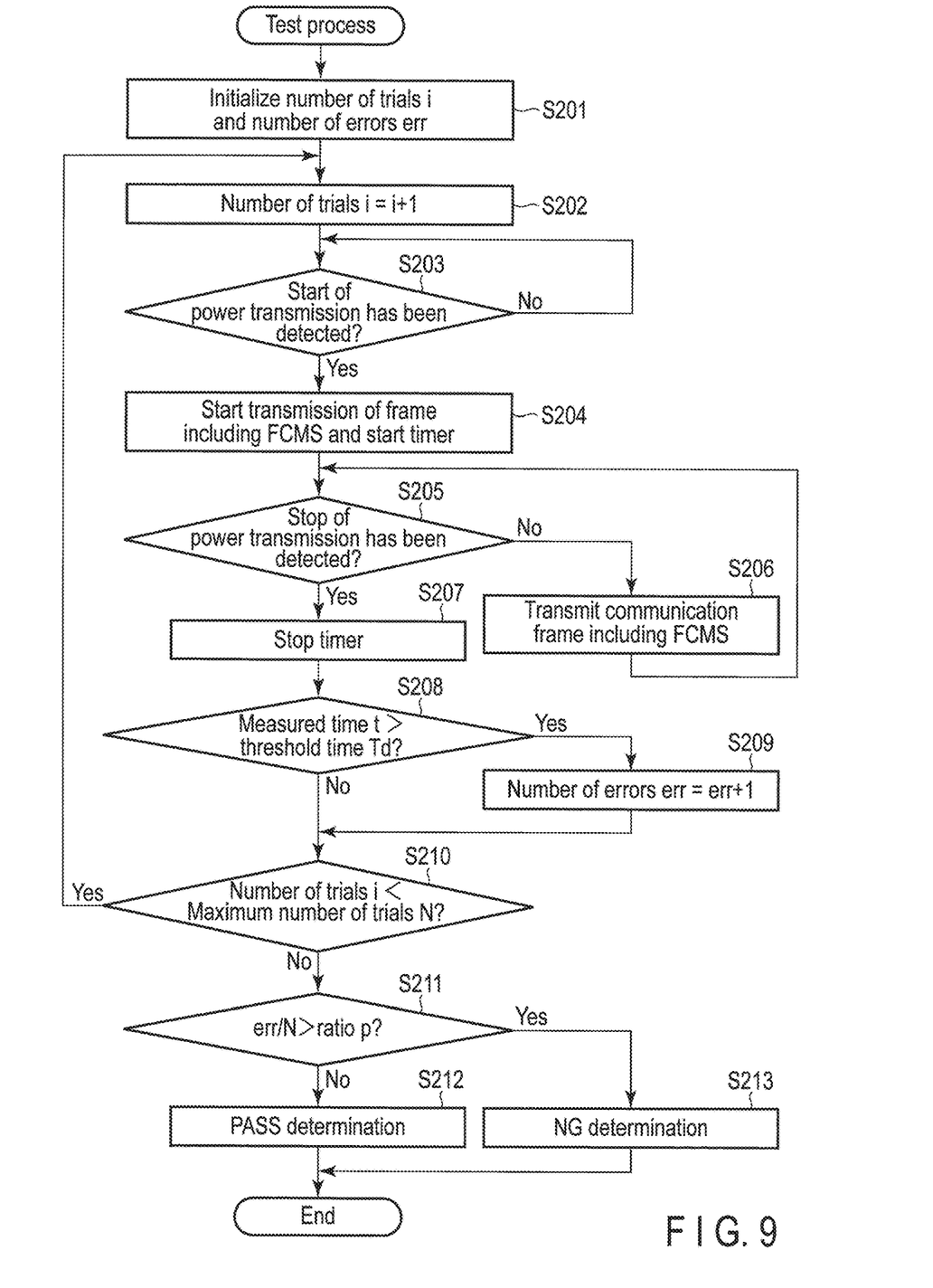
FIG. 9 is a flowchart illustrating an example of the procedure of a test process executed by the test apparatus of FIG. 8.

The flowchart of FIG. 9 illustrates an example of the procedure of a test process executed by the test apparatus 7. The test apparatus 7 determines whether the wireless power transmission apparatus 1 has the power transmission control function by performing trials a specific number of times (for example, N times).

Firstly, the test apparatus 7 sets zero as each of the number of trials i and the number of errors err, for initialization (step S201). Then, the test apparatus 7 adds one to the number of trials i (step S202).

Then, the test apparatus 7 determines whether a start of power transmission by the wireless power transmission apparatus 1 has been detected (step S203). If a start of power transmission has not been detected (NO in step S203), the process returns to step S203, and whether a start of a power transmission has been detected is again determined.

On the other hand, if a start of power transmission has been detected (YES in step S203), the test apparatus 7 starts transmitting a communication frame 4 including an FCMS (specifically, a preamble signal and a unique word signal) and starts the timer 711 (step S204). Slots other than the FCMS in the communication frame 4 to be transmitted may be empty.

Then, the test apparatus 7 determines whether a stop of the power transmission by the wireless power transmission apparatus 1 has been detected (step S205).

If a stop of the power transmission has not been detected (NO in step S205), the test apparatus 7 transmits a communication frame 4 including an FCMS (step S206). In step S206, the communication frame 4 is transmitted following the communication frame 4 in step S204, for example.

If a stop of the power transmission has been detected (YES in step S205), the test apparatus 7 stops the timer 711 (step S207) and determines whether the measurement time t measured by the timer 711 exceeds the threshold time Td (step S208).

If the measurement time t exceeds the threshold time Td (YES in step S208), the test apparatus 7 adds one to the number of errors err (step S209). That is, in the i-th trial, the wireless power transmission apparatus 1 has not transitioned to a power transmission stop state within the threshold time Td since the FCMS was transmitted. Therefore, the test apparatus 7 determines that a function to stop the power transmission in accordance with detection of an FCMS is not operated, and increases the number of errors err by one. Note that, if the measurement time t is equal to or shorter than the threshold time Td (NO in step S208), step S209 is skipped.

Then, the test apparatus 7 determines whether the number of trials i is smaller than the maximum number of trials N (step S210). If the number of trials i is smaller than the maximum number of trials N (YES in step S210), the process returns to step S202, and the next trial is started.

If the number of trials i is equal to or larger than the maximum number of trials N (NO in step S210), the test apparatus 7 calculates a ratio of the number of errors err to the maximum number of trials N (=err/N), and determines whether the calculated ratio exceeds a specific ratio p (step S211). If the calculated ratio exceeds the specific ratio p (YES in step S211), the test apparatus 7 determines that the wireless power transmission apparatus 1 does not have the power transmission control function that satisfies the specification (NG determination) (step S213). On the other hand, if the calculated ratio is equal to or smaller than the specific ratio p (NO in step S211), the test apparatus 7 determines that the wireless power transmission apparatus 1 has the power transmission control function that satisfies the specification (PASS determination) (step S213).

From the above, the test apparatus 7 can verify whether the wireless power transmission apparatus 1 has the power transmission control function to reduce the interference with the wireless communication system 3.

Second Embodiment

In the first embodiment, in the period T2 after the power transmission performed during the period T1, the carrier sensing to monitor the existence of a communication signal transmitted by the wireless communication system 3 is performed. In contrast, in a second embodiment, a candidate of a communication signal is detected in monitoring performed during the period T2, and in a period T3 after the period T2 in which the candidate is detected, carrier sensing to further verify the existence of a communication signal is performed.

The structure of a wireless power transmission apparatus 1 of the second embodiment is similar to that of the wireless power transmission apparatus 1 of the first embodiment, and between the first and second embodiments, only the structure for the carrier sensing to verify the existence of a communication signal in the period T3 is different. Hereinafter, the points different from the first embodiment will be mainly explained.

Figure 10:
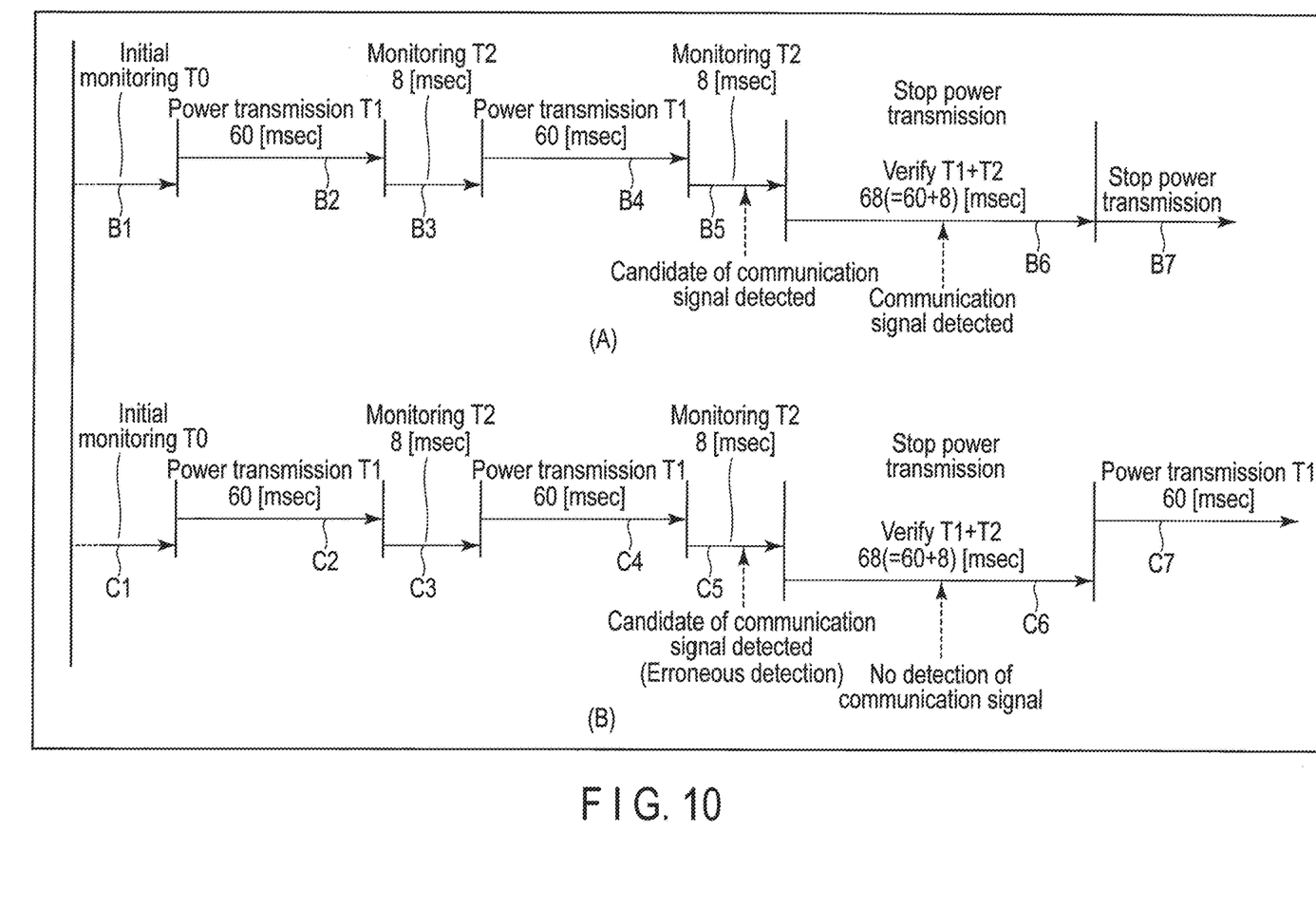
FIG. 10 is a time chart illustrating an example of an operation of an electronic apparatus according to a second embodiment.

FIG. 10 is a time chart illustrating examples of operations by the wireless power transmission apparatus 1. FIG. 10(A) illustrates an example of a case where a communication signal is detected in the verifying of the existence of a communication signal in the period T3. On the other hand, FIG. 10(B) illustrates an example of a case where a communication signal is not detected in the verifying of the existence of a communication signal in the period T3. In each of periods of B1 to B4 in FIG. 10(A) and periods of C1 to C4 in FIG. 10(B), an operation similar to the operation performed in the periods of A1 to A4, which is explained above with reference to the time chart of FIG. 2, is performed.

In the example of FIG. 10(A), after the power transmission during the period T1 (B4), the detector 13 monitors the existence of a candidate of a communication signal (for example, a DSRC signal) transmitted by the wireless communication system 3 during the period T2 (B5). If a candidate of a communication signal transmitted by the wireless communication system 3 has been detected within the period T2 for the monitoring, power transmission during the period T1 is not performed, and the detector 13 verifies the existence of a communication signal transmitted by the wireless communication system 3 during the period T3 (B6).

The period T3 is equal to or longer than the period T2, and, for example, is substantially n times as long as the sum of the periods T1 and T2. Note that n is a natural number. For example, if the period T1 is 60 ms, the period T2 is 8 ms, and n=1, the period T3 is set to 68 ms. By setting a length of the period T3 to be n times as long as the sum of the periods T1 and T2, the operation of verifying can be added without disturbing the cycle of the power transmission during the period T1 and the monitoring during the period T2.

If the communication signal transmitted by the wireless communication system 3 has been detected in the verifying during the period T3, the wireless power transmission apparatus 1 does not perform power transmission during the period T1 (B7). That is, the power transmission during the period T1 is stopped. If the power transmission is not performed, the wireless power transmission apparatus 1 returns to the initial monitoring during the period T0, for example.

Furthermore, In the example of FIG. 10(B), after the power transmission during the period T1 (C4), the wireless power transmission apparatus 1 monitors the existence of a candidate of a communication signal (for example, a DSRC signal) transmitted by the wireless communication system 3 during the period T2 (C5). If a candidate of a communication signal transmitted by the wireless communication system 3 has been detected within the period T2 for the monitoring, the power transmission during the period T1 is not performed, and the detector 13 verifies the existence of a communication signal transmitted by the wireless communication system 3 during the period T3 (C6).

If a communication signal transmitted by the wireless communication system 3 has not been detected during the verifying during the period T3, it is determined that the candidate of the communication signal detected in the monitoring during the period T2 (C5) was erroneously detected, and the transmitter 12 performs power transmission during the period T1 (C7).

That is, before the transmitter 12 starts power transmission, the detector 13 performs the carrier sensing in the first frequency band, which includes at least the transmission frequency band of the communication frame 4, during the period T0 that is longer than each of the period T2 and the period T3. Then, if any communication signal has not been detected by the carrier sensing performed during the period T0, the transmitter 12 transmits a power transmission signal during the period T1.

Furthermore, if a communication signal has been detected by the carrier sensing performed during the period T2, the detector 13 performs carrier sensing in the first frequency band, which includes at least the transmission frequency band of the communication frame 4, during the period T3 following the period T2. Then, if a communication signal has not been detected by the carrier sensing performed during the period T3, the transmitter 12 transmits a power transmission signal during the period T1 following the period T3. Furthermore, the detector 13 performs carrier sensing in the first frequency band during the period T2 following the period T1. On the other hand, if a communication signal has been detected by the carrier sensing performed during the period T3, power transmission during the period T1 is not performed, and the process returns to the initial monitoring during the period T0.

Furthermore, the detector 13 may perform carrier sensing in a second frequency band during the period T2. The second frequency band includes at least a transmission frequency band of a first communication frame defined by a first wireless communication standard (for example, the standard of DSRC) and a transmission frequency band of a second communication frame defined by a second wireless communication standard (for example, the wireless LAN communication standard). In that case, if a communication signal has not been detected by the carrier sensing performed during the period T2, the transmitter 12 transmits a power transmission signal during the period T1 following the period T2. Furthermore, if a communication signal has been detected by the carrier sensing performed during the period T2, the detector 13 performs carrier sensing in the second frequency band during the period T3 following the period T2. Since several types of communication signals are monitored during the monitoring performed during the period T2, an affect that the period T1 for the power transmission is shortened can be reduced.

As can be understood from the above, the monitoring during the period T2 is performed after the power transmission during the period T1, and if a candidate of a communication signal transmitted by the wireless communication system 3 is detected during the monitoring, power transmission during the period T1 is not performed and the verifying is performed during the period T3. The communication signal may be erroneously detected in the period T2. If power transmission is not performed and the process returns to the initial monitoring performed during the period T0 based on the communication signal erroneously detected, it takes a long time to restart the power transmission because the period T0 is longer than each of the period T1, the period T2, and the period T3. The wireless power transmission apparatus 1 handles the communication signal detected in the monitoring during the period T2 as a candidate and verifies the existence of the communication signal during the period T3, which follows period T2 and is equal to or longer than the period T2, in order to reduce such an erroneous detection.

In the monitoring of the period T2, a communication signal may be detected based on one known signal while a communication signal may be detected based on several known signals in the verifying of the period T3. Thus, in the verifying of the period T3, the existence of the communication signal transmitted by the wireless communication system 3 can be determined with higher accuracy than the monitoring of the period T2.

If it is determined that a communication signal has not been transmitted in the verifying of the period T3, the wireless power transmission apparatus 1 resumes the power transmission (that is, performs the power transmission during the period T1). Thus, even if an erroneous detection is generated in the monitoring of the period T2, the power transmission is only suspended during the period T3 that is shorter than the period T0 of the initial monitoring and is then resumed.

Figure 11:
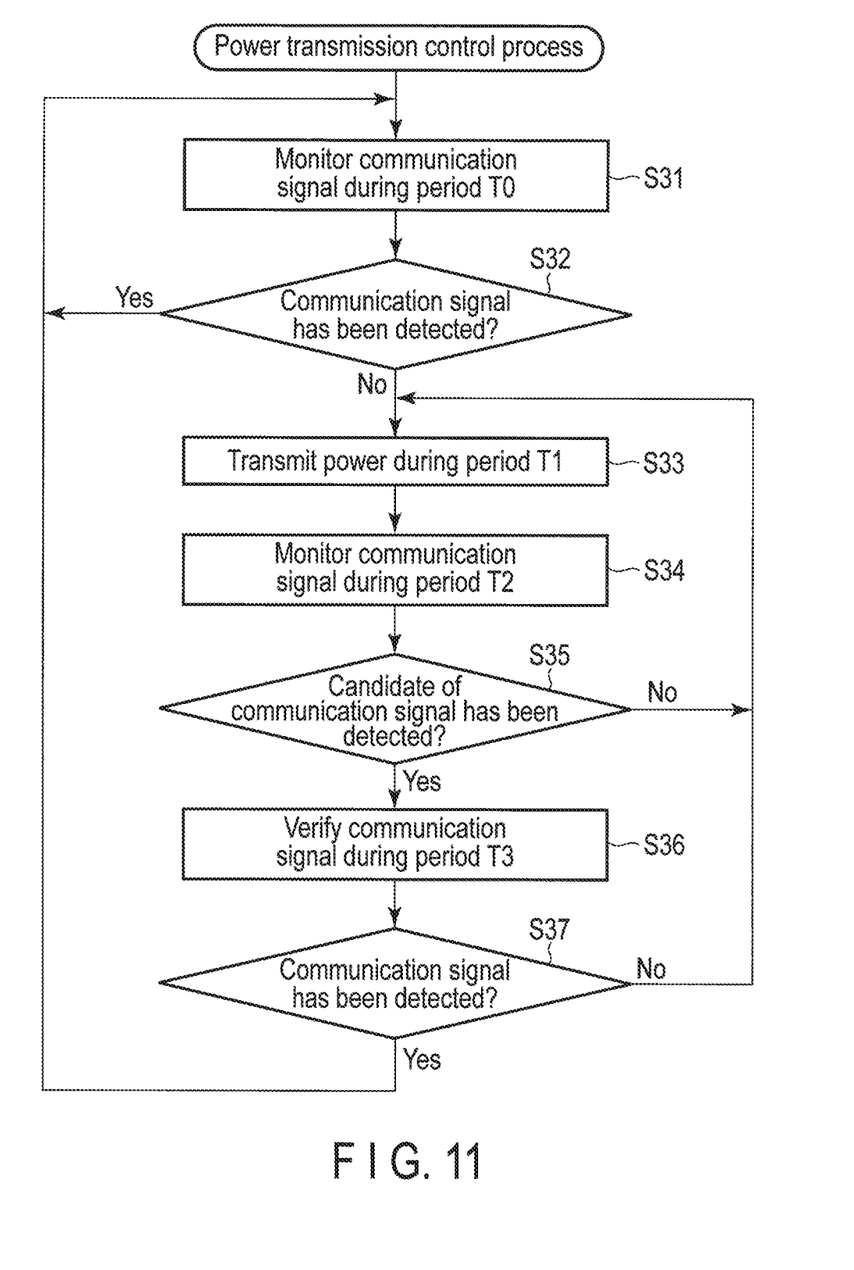
FIG. 11 is a flowchart illustrating an example of the procedure of a power transmission control process executed by the electronic apparatus of the second embodiment.

With reference to the flowchart of FIG. 11, an example of the procedure of a power transmission control process executed by the wireless power transmission apparatus 1 will be explained. Steps S31 to S34 in the flowchart of FIG. 11 are the same as above-explained steps S11 to S14 in the flowchart of FIG. 7.

After the monitoring of a communication signal performed during the period T2 in step S34 is finished, the wireless power transmission apparatus 1 determines whether a candidate of a communication signal transmitted by the wireless communication system 3 has been detected within the period T2 (step S35). If a candidate of a communication signal transmitted by the wireless communication system 3 has not been detected (NO in step S35), the process returns to step S33, and the power transmission is performed during the period T1.

On the other hand, if a candidate of a communication signal transmitted by the wireless communication system 3 has been detected (YES in step S35), the wireless power transmission apparatus 1 verifies, during the period T3 following the period T2, a communication signal transmitted by the wireless communication system 3 through the antenna transmission/reception units 14 and the antennas 15 (step S36). That is, the wireless power transmission apparatus 1 performs carrier sensing in the first frequency band, which includes at least the transmission frequency band of a communication frame 4, during the period T3 following the period T2. Thus, the wireless power transmission apparatus 1 verifies the existence of a communication signal more accurately by monitoring a communication signal transmitted by the wireless communication system 3 during the period T3 that is equal to or longer than the period T2.

Then, the wireless power transmission apparatus 1 determines whether a communication signal transmitted by the wireless communication system 3 has been detected within the period T3 (step S37). If the communication signal transmitted by the wireless communication system 3 has not been detected (NO in step S37), the process returns to step S33.

On the other hand, if the communication signal transmitted by the wireless communication system 3 has been detected (YES in step S37), the process returns to step S31, and the initial monitoring of the communication signal is again performed.

As can be understood from the above, the interference with the wireless communication system 3 can be reduced and an effect on the power transmission because of an erroneous detection of a communication signal can be reduced as well.

As explained above, according to the first and second embodiments, interference with other wireless communication systems can be reduced. The transmitter 12 transmits a first transmission signal for power supply during a period T1 via a transmission frequency band defined by a first wireless communication standard (for example, the standard of DSRC system). The detector 13 performs carrier sensing in a first frequency band including at least the transmission frequency band during a period T2 following the period T1. The period T2 is equal to or longer than the length of a communication frame 4. If a wireless signal is not detected in the carrier sensing performed during the period T2, the transmitter 12 transmits a second transmission signal for power supply during the period T1 following the period T2. If the wireless signal is detected by the carrier sensing performed during the period T2, the detector 13 performs carrier sensing in the first frequency band during a period T3 following the period T2.

As above, if a wireless signal (a communication signal) transmitted by other wireless communication systems 3 is not detected by the carrier sensing performed during the period T2, the transmission signal is transmitted during the period T1 after the period T2, and on the other hand, if a wireless signal transmitted by the other wireless communication systems 3 is detected in the carrier sensing performed during the period T2, carrier sensing is further performed during the period T3 following the period T2. Therefore, interference with the communication signal transmitted in the wireless communication system 3 caused by the power transmission signal transmitted by the wireless power transmission apparatus 1 can be reduced.

Each of the various functions described in the first and second embodiments may be realized by a processing circuit. The processing circuit includes a programmed processor such as a central processing unit (CPU). This processor performs each of the above functions by executing a computer program (instructions) stored in a memory. The processor may be a microprocessor including an electronic circuit. For example, the processing circuit may be a digital signal processor (DSP), an application specific integrated circuit (ASIC), a microcontroller, a controller and other electronic circuit components. Each of other components described in the first and second embodiments other than the CPU may be realized as a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
transmitter circuitry configured to transmit a first transmission signal for power supply during a first period via a transmission frequency band defined by a first wireless communication standard; and
processing circuitry configured to perform carrier sensing in a first frequency band comprising at least the transmission frequency band during a second period following the first period, wherein the second period is equal to or longer than a length of a first frame,
wherein the transmitter circuitry is further configured to transmit, if a wireless signal is not detected in the carrier sensing performed during the second period, a second transmission signal for power supply during a third period following the second period, and
wherein the processing circuitry is configured to perform, if the wireless signal is detected in the carrier sensing performed during the second period, carrier sensing in the first frequency band during a fourth period following the second period.

2. The electronic apparatus of claim 1, wherein:
the fourth period is equal to or longer than the second period,
the transmitter circuitry is further configured to transmit, if a wireless signal is not detected in the carrier sensing performed during the fourth period, a third transmission signal for power supply during a fifth period following the fourth period, and
the processing circuitry is configured to perform carrier sensing in the first frequency band during a sixth period following the fifth period.

3. The electronic apparatus of claim 1, wherein:
the fourth period is substantially n-times (n is a natural number) as long as a sum of the first and second periods.

4. The electronic apparatus of claim 1, wherein:
the processing circuitry is configured to perform, if the transmitter circuitry starts power transmission, carrier sensing in the first frequency band during a seventh period preceding the first period, wherein the seventh period is longer than each of the second period and the fourth period, and
the transmitter circuitry is further configured to transmit, if a wireless signal is not detected in the carrier sensing performed during the seventh period, the first transmission signal during the first period.

5. The electronic apparatus of claim 4, further comprising:
second processing circuitry configured to change, if the first frame is detected in the carrier sensing performed during the seventh period, at least one of directivity of a signal transmitted by the transmitter circuitry through one or more antennas and directivity of a signal received by the processing circuitry through one or more antennas.

6. The electronic apparatus of claim 1, wherein:
the first wireless communication standard is a standard of a dedicated short-range communication (DSRC) system.

7. The electronic apparatus of claim 6, wherein:
the first frame defined by the first wireless communication standard comprises a frame control message slot (FCMS) defined by the standard of the dedicated short-range communication (DSRC) system.

8. The electronic apparatus of claim 7, wherein:
the frame control message slot (FCMS) comprises at least one of a preamble signal and a unique word signal.

9. The electronic apparatus of claim 1, wherein:
the processing circuitry is further configured to perform carrier sensing in a second frequency band during an eighth period following the first period, the second frequency band comprises at least the transmission frequency band and a transmission frequency band defined by a second wireless communication standard, and the eighth period is equal to or longer than a length of the first frame or a length of a second frame, the transmitter circuitry is further configured to transmit, if a wireless signal is not detected in the carrier sensing performed during the eighth period, a fourth transmission signal for power supply during a ninth period following the eighth period, and the processing circuitry is configured to perform, if the wireless signal is detected in the carrier sensing performed during the eighth period, carrier sensing in the second frequency band during a tenth period following the eighth period.

10. A method of controlling an electronic apparatus that comprises: (i) transmitter circuitry configured to transmit a first transmission signal for power supply during a first period via a transmission frequency band defined by a first wireless communication standard; and (ii) processing circuitry configured to perform carrier sensing in a first frequency band comprising at least the transmission frequency band during a second period following the first period, wherein the second period is equal to or longer than a length of a first frame, the method comprising:

transmitting, by the transmitter circuitry, if a wireless signal is not detected in the carrier sensing performed during the second period, a second transmission signal for power supply during a third period following the second period, and performing, by the processing circuitry, if the wireless signal is detected in the carrier sensing performed during the second period, carrier sensing of the first frequency band during a fourth period following the second period.

11. The method of claim 10, wherein:
the fourth period is equal to or longer than the second period, and
the method further comprises:
transmitting, by the transmitter circuitry, if a wireless signal is not detected in the carrier sensing performed during the fourth period, a third transmission signal for power supply during a fifth period following the fourth period; and
performing, by the processing circuitry, carrier sensing of the first frequency band during a sixth period following the fifth period.

12. The method of claim 10, wherein:
the fourth period is substantially n-times (n is a natural number) as long as a sum of the first and second periods.

13. The method of claim 10 further comprising:
performing, by the processing circuitry, if the transmitter circuitry starts power transmission, carrier sensing of the first frequency band during a seventh period preceding the first period, wherein the seventh period is longer than each of the second period and the fourth period; and transmitting, by the transmitter circuitry, if a wireless signal is not detected in the carrier sensing performed during the seventh period, the first transmission signal during the first period.

14. The method of claim 13 further comprising:
changing, if the first frame is detected in the carrier sensing performed during the seventh period, at least one of directivity of a signal transmitted by the transmitter circuitry through one or more antennas and directivity of a signal received by the processing circuitry through one or more antennas.

15. The method of claim 10, wherein:
the first wireless communication standard is a standard of a dedicated short-range communication (DSRC) system.

16. The method of claim 15, wherein:
the first frame defined by the first wireless communication standard comprises a frame control message slot (FCMS) defined by the standard of the dedicated short-range communication (DSRC) system.

17. The method of claim 16, wherein:
the frame control message slot (FCMS) comprises at least one of a preamble signal and a unique word signal.

18. The method of claim 10 further comprising:
performing, by the processing circuitry, carrier sensing in a second frequency band during an eighth period following the first period, wherein the second frequency band comprises at least the transmission frequency band and a transmission frequency band defined by a second wireless communication standard, and the eighth period is equal to or longer than a length of the first frame or a length of a second frame;

transmitting, by the transmitter circuitry, if a wireless signal is not detected in the carrier sensing performed during the eighth period, a fourth transmission signal for power supply during a ninth period following the eighth period; and performing, by the processing circuitry, if the wireless signal is detected in the carrier sensing performed during the eighth period, carrier sensing in the second frequency band during a tenth period following the eighth period.

* * * * *